(12) United States Patent
DeSalvo

(10) Patent No.: US 12,454,314 B1
(45) Date of Patent: Oct. 28, 2025

(54) STEERING ASSEMBLY

(71) Applicant: Deere & Company, Moline, IL (US)

(72) Inventor: Anthony T. DeSalvo, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/062,302

(22) Filed: Feb. 25, 2025

(51) Int. Cl.
*B62D 7/20* (2006.01)
*B62D 7/16* (2006.01)
*F16C 11/06* (2006.01)

(52) U.S. Cl.
CPC ............ *B62D 7/20* (2013.01); *B62D 7/163* (2013.01); *F16C 11/0642* (2013.01); *F16C 11/0647* (2013.01); *F16C 11/069* (2013.01); *F16C 2326/24* (2013.01)

(58) Field of Classification Search
CPC . B62D 7/20; B62D 7/16; B62D 7/163; B62D 7/166; B62D 7/00; B62D 3/00; B62D 3/02; F16C 11/0642; F16C 11/0647; F16C 11/069; F16C 2326/24
USPC ............ 280/93.51, 93.511, 93.512; 180/400, 180/434, 435, 437, 439
See application file for complete search history.

(56) References Cited

U.S. PATENT DOCUMENTS

| | | | | |
|---|---|---|---|---|
| 5,564,853 | A | * 10/1996 | Maughan | F16C 11/069 29/898.047 |
| 5,799,968 | A | * 9/1998 | Loeffler | B60G 7/005 403/143 |
| 5,839,845 | A | * 11/1998 | Kincaid | F16C 11/0647 403/135 |
| 6,470,991 | B1 | 10/2002 | Bowman et al. | |
| 8,764,336 | B2 | 7/2014 | Kraatz | |
| 9,982,711 | B1 | * 5/2018 | Henriksen | F16C 11/0642 |
| 11,260,714 | B2 | 3/2022 | Thoreson et al. | |
| 11,292,515 | B2 | 4/2022 | Thoreson | |

FOREIGN PATENT DOCUMENTS

KR 100379931 B1 * 4/2003 ............. B62D 7/163

* cited by examiner

*Primary Examiner* — Keith J Frisby

(57) ABSTRACT

A steering assembly includes a piston rod including internal threads positioned on an inner wall of a recess, an inner tie rod housing including external threads engaging with the internal threads, the inner tie rod housing adjustably connected to the piston rod, a tie rod including an inner tie rod having an end positioned at least partially in the inner tie rod housing, a retainer including a wall portion and a flange portion, the retainer positioned at least partially in the recess, the retainer including a protrusion extending from an outer surface of the wall portion and contacting the inner wall of the recess, which resists rotation of the retainer, and one or more fasteners releasably attaching the retainer to the inner tie rod housing.

20 Claims, 6 Drawing Sheets

US 12,454,314 B1

STEERING ASSEMBLY

FIELD OF THE DISCLOSURE

The present disclosure relates to a steering assembly in a work vehicle.

BACKGROUND

Steering assemblies for work vehicles include right and left tie rods connected between a steering cylinder and right and left steering knuckles.

SUMMARY

According to an aspect of the present disclosure, a steering assembly includes a piston rod including internal threads positioned on an inner wall of a recess, an inner tie rod housing including external threads engaging with the internal threads, the inner tie rod housing adjustably connected to the piston rod, a tie rod including an inner tie rod having an end positioned at least partially in the inner tie rod housing, a retainer including a wall portion and a flange portion, the retainer positioned at least partially in the recess, the retainer including a protrusion extending from an outer surface of the wall portion and contacting the inner wall of the recess, which resists rotation of the retainer, and one or more fasteners releasably attaching the retainer to the inner tie rod housing.

According to an aspect of the present disclosure, the retainer resists rotation of the inner tie rod housing.

According to an aspect of the present disclosure, the retainer is positioned adjacent to the inner tie rod housing.

According to an aspect of the present disclosure, the inner wall of the recess includes an indentation corresponding to the protrusion of the retainer.

According to an aspect of the present disclosure, the retainer has a larger diameter than the inner tie rod housing and the inner wall of the recess includes a step having a larger diameter for the retainer.

According to an aspect of the present disclosure, the flange portion includes one or more slots which the one or more fasteners pass through and thread into one or more apertures in the inner tie rod housing.

According to an aspect of the present disclosure, the retainer includes an inner groove in an inner surface of the wall portion.

According to an aspect of the present disclosure, the retainer includes an outer groove in the outer surface for receiving a seal.

According to an aspect of the present disclosure, the inner tie rod housing retains the end of the inner tie rod within the recess of the piston rod.

According to an aspect of the present disclosure, the one or more fasteners are positioned around the circumference of the retainer.

According to an aspect of the present disclosure, a work vehicle includes a steering assembly described herein.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
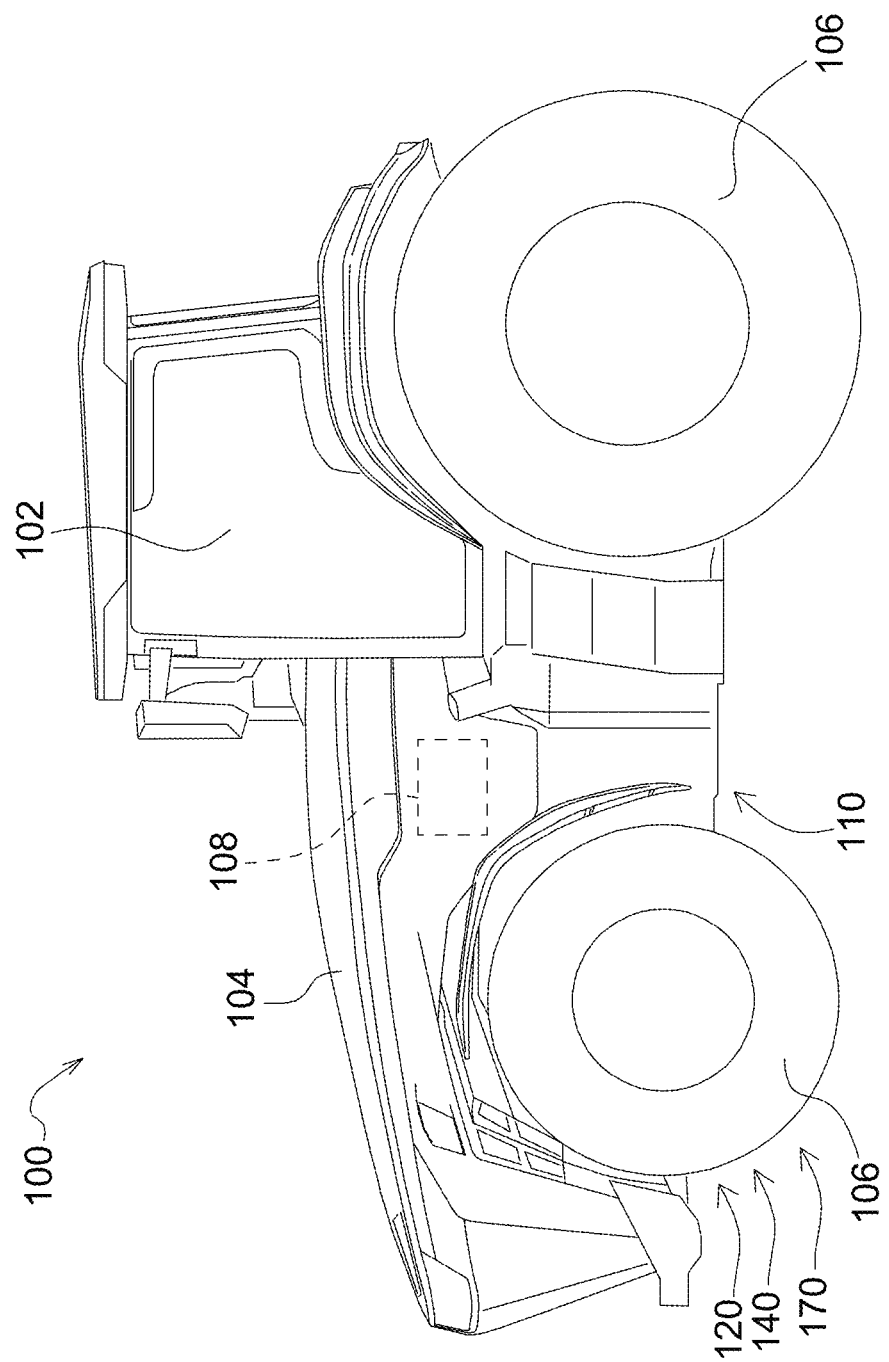
FIG. 1 is a perspective view of a work vehicle including a steering assembly, according to an implementation.
Figure 2:
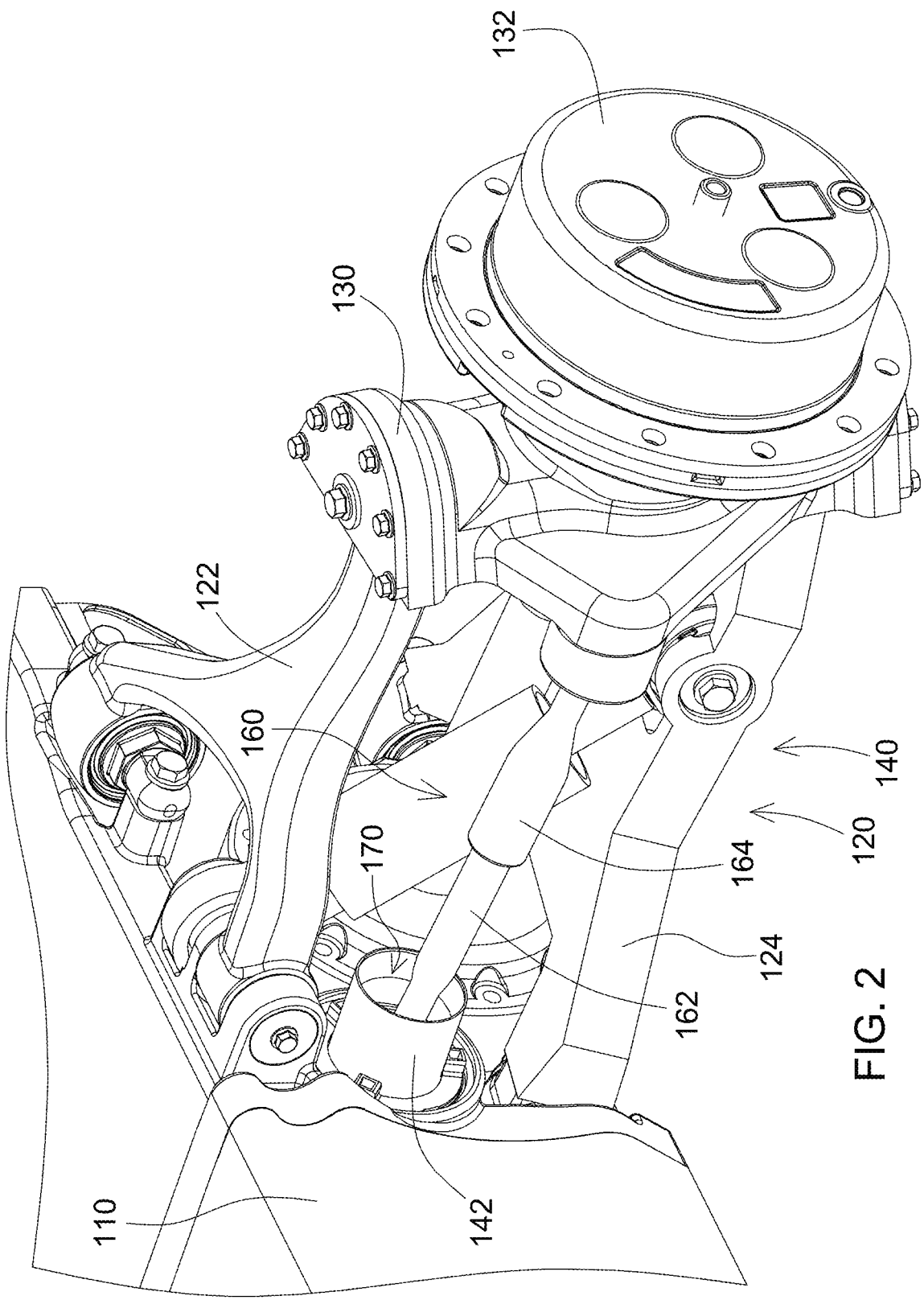
FIG. 2 is a perspective view of a steering assembly, according to an implementation.
Figure 3:
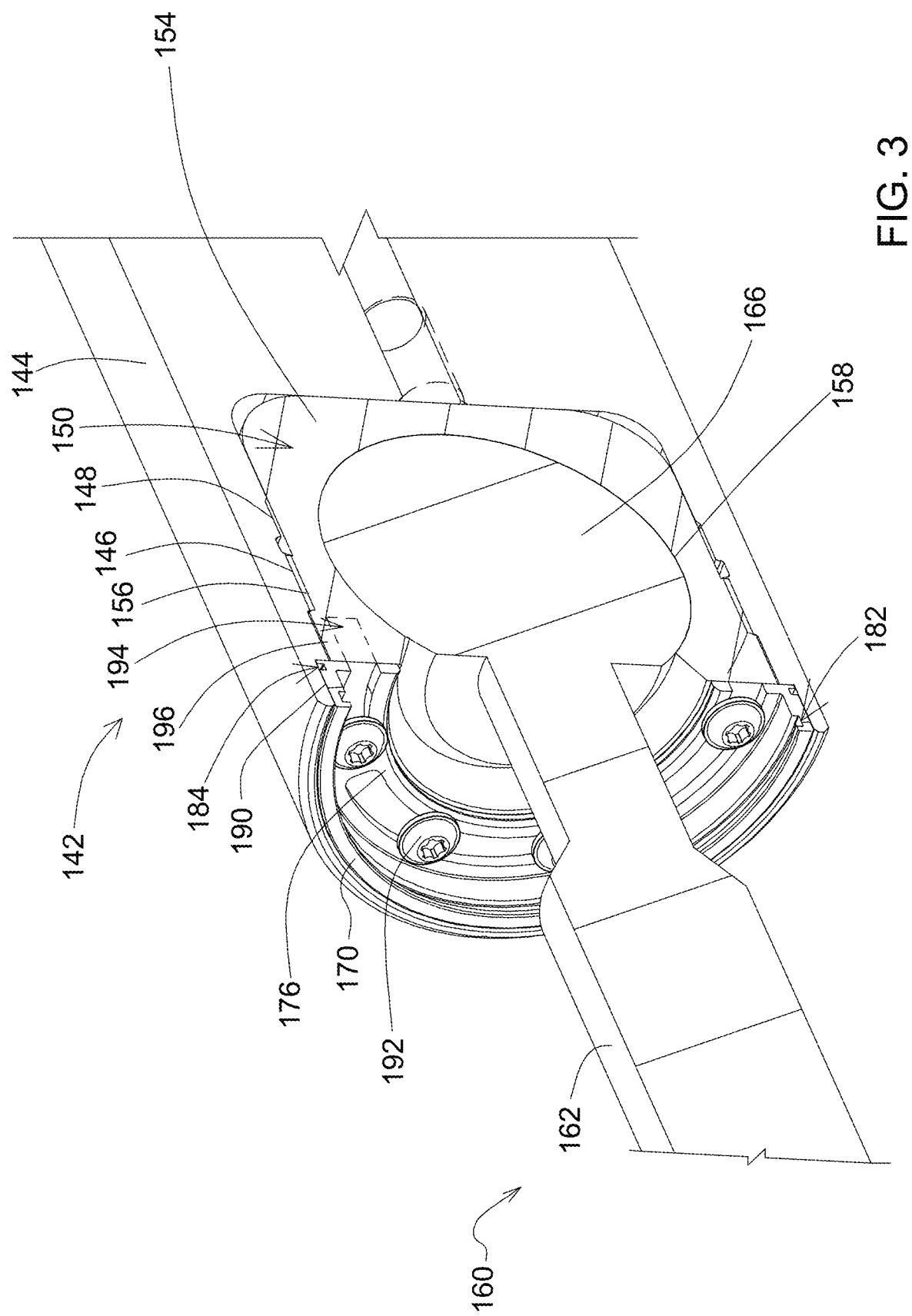
FIG. 3 is a partial cutaway view of a retention apparatus, according to an implementation.
Figure 4:
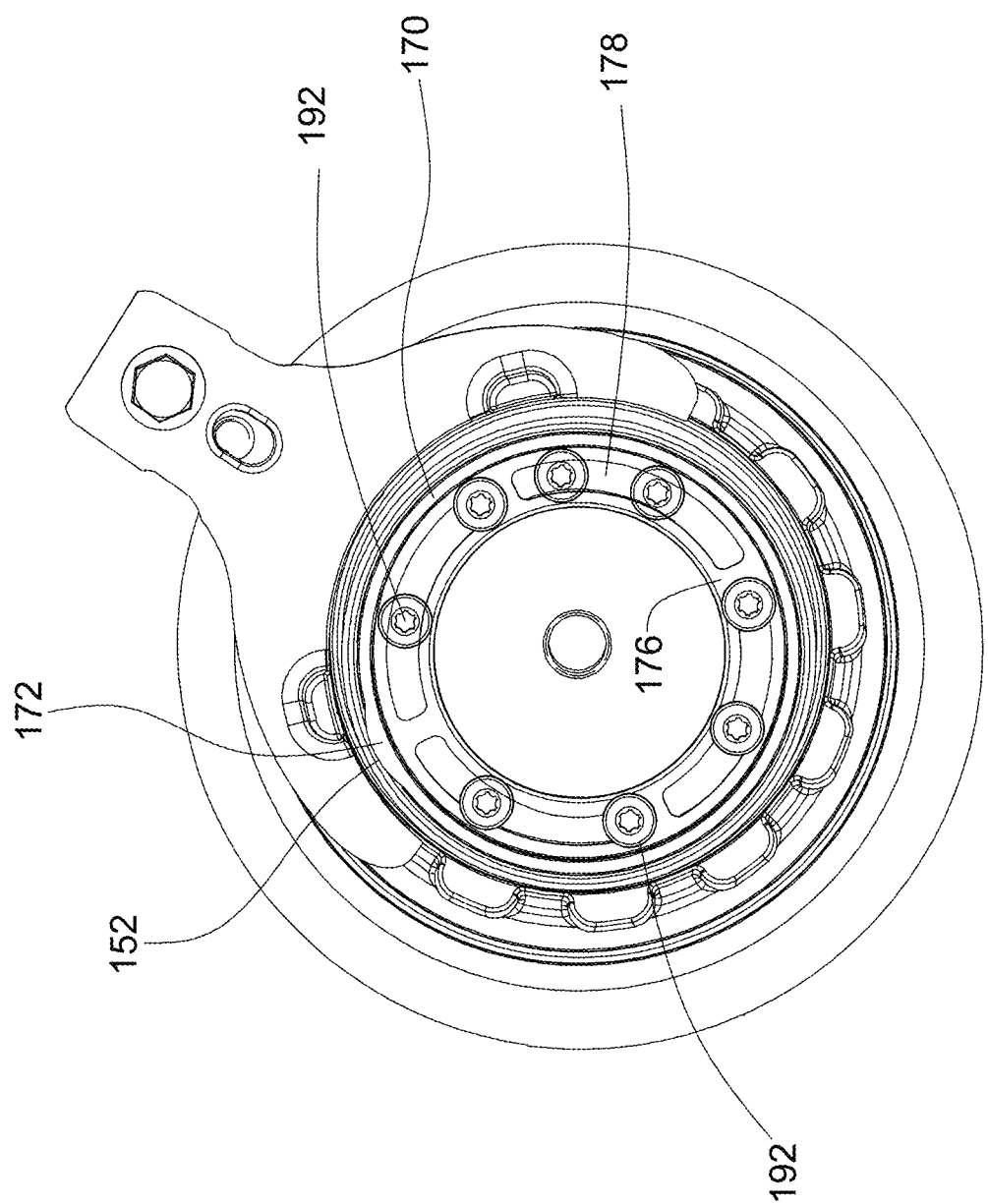
FIG. 4 is a perspective view of a retention apparatus, according to an implementation.
Figure 5:
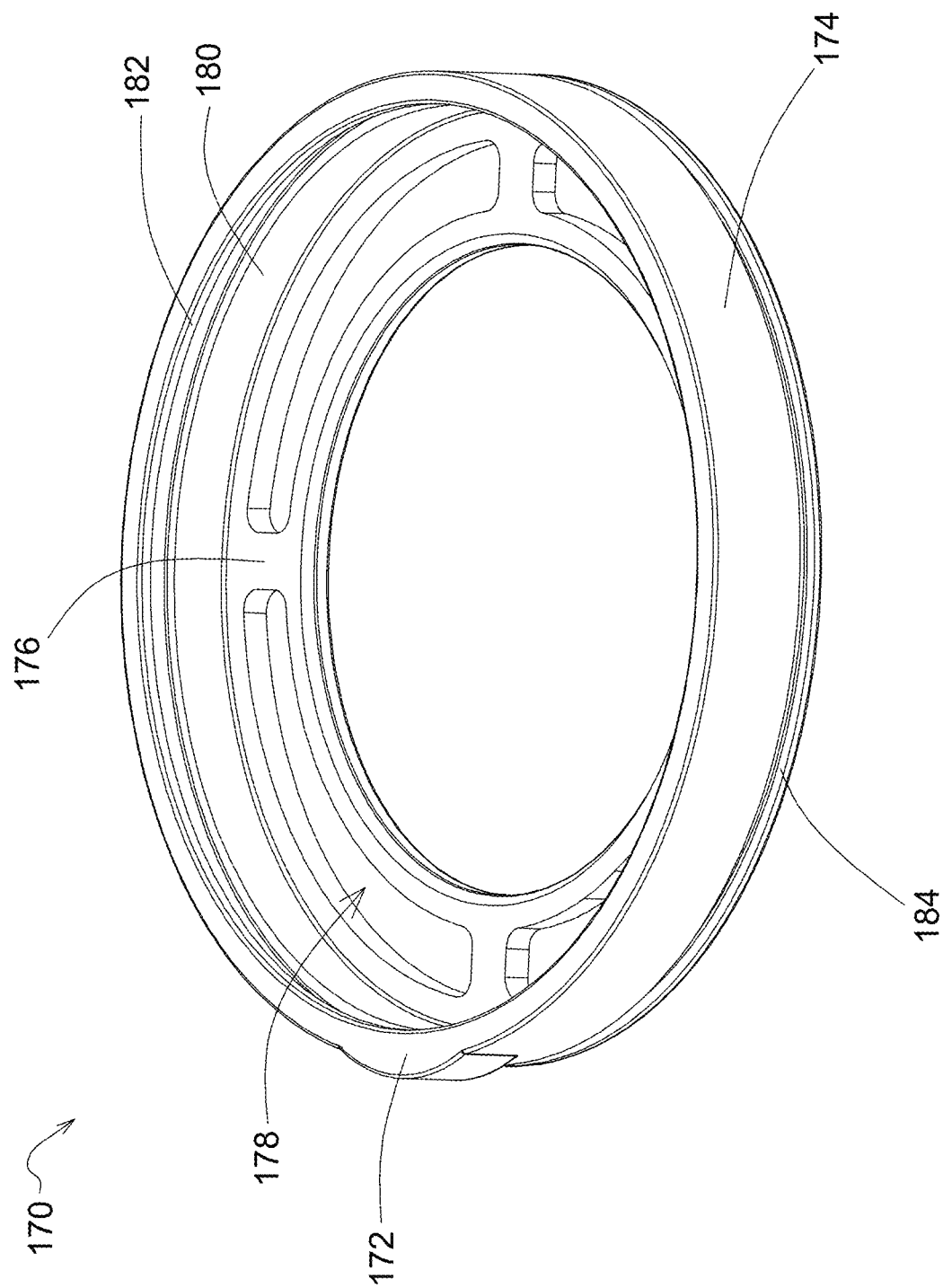
FIG. 5 is a perspective view of a retention apparatus, according to an implementation.
Figure 6:
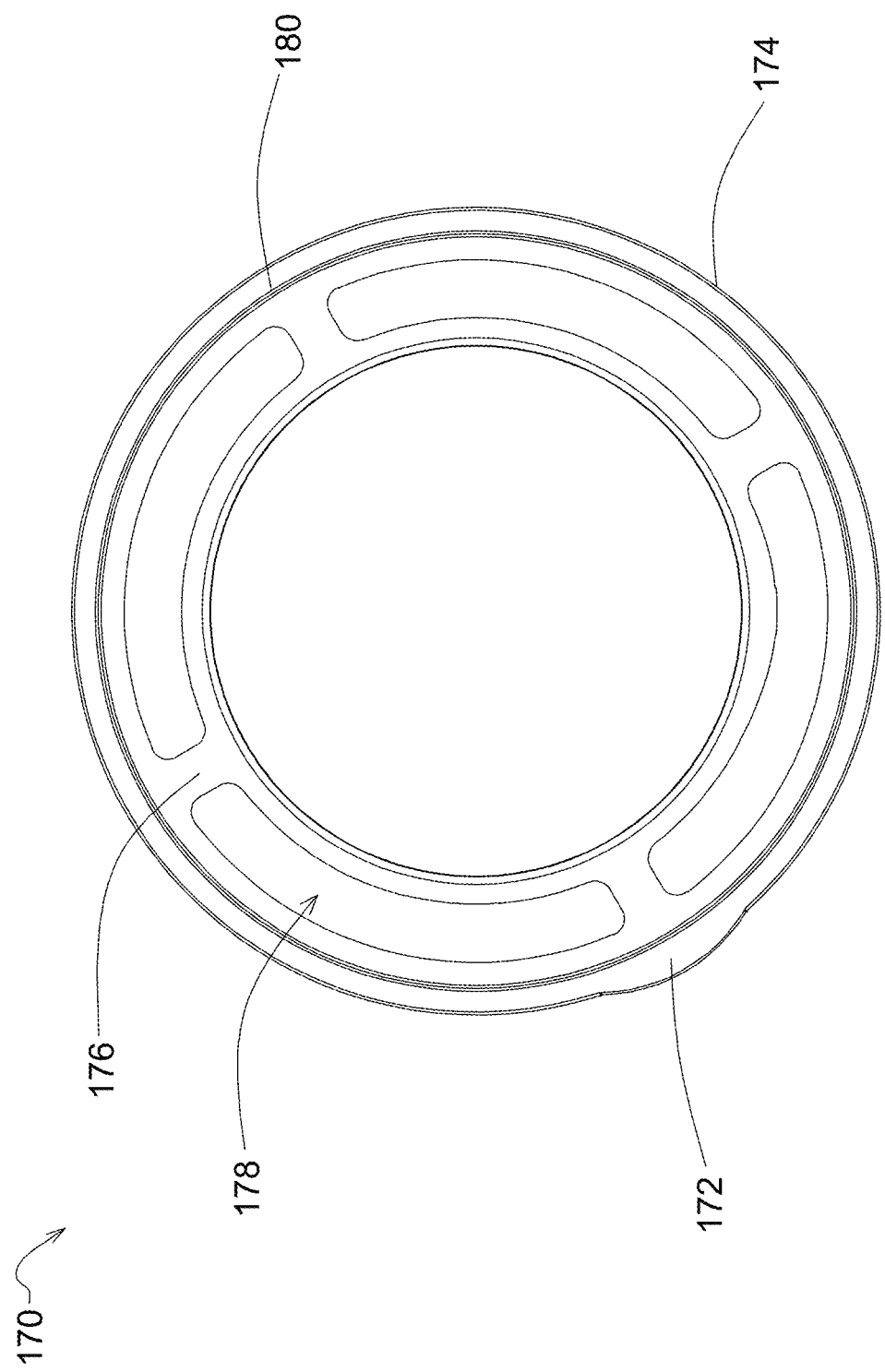
FIG. 6 is a perspective view of a retention apparatus, according to an implementation.

With reference to FIG. 1, a work vehicle 100, for example an agricultural tractor, can include an operator station or cab 102, a hood 104, one or more ground engaging apparatus 106 (e.g., wheels or track assemblies), one or more power sources 108 (e.g., an internal combustion engine, a hybrid engine, a battery, an electric machine, or any combination of power sources), and a frame or chassis 110. The work vehicle 100 can have a rigid or an articulated frame or chassis 110. The work vehicle 100 can include a suspension assembly 120 and a steering assembly 140 for the front wheels 106.

With reference to FIGS. 2-6, the suspension assembly 120 can be the same or a mirror image for the left and right sides of the work vehicle 100. The suspension assembly 120 can include a first suspension arm or upper control arm 122 and a second suspension arm or lower control arm 124 connected between the chassis 110 and a steering knuckle 130. A suspension cylinder can connect between the chassis 110 and either the upper or lower control arm 122, 124. The steering knuckle 130 rotatably supports a wheel hub 132 for attaching a ground engaging apparatus 106, such as a wheel.

The steering assembly 140 can be the same or a mirror image for the left and right sides of the work vehicle 100. The steering assembly 140 can include a steering cylinder 142 connected or attached to the chassis 110. The steering cylinder 142 can include a piston rod 144 having an interior space or recess 150. The piston rod 144 can include internal threads 146 positioned on an inner wall 148 of the interior space or recess 150. An inner tie rod housing 154 can include external threads 156 engaging with the internal threads 146 when the inner tie rod housing 154 is positioned inside the piston rod 144. The inner tie rod housing 154 can be adjustably connected to the piston rod 144 via the interaction between the internal threads 146 and the external threads 156. Rotating the inner tie rod housing 154 adjusts the axial position of the inner tie rod housing 154 within the recess 150 of the piston rod 144. Rotating the inner tie rod housing 154 in a first direction moves the inner tie rod housing 154 further into the recess 150 of the piston rod 144. Rotating the inner tie rod housing 154 in an opposite second direction moves the inner tie rod housing 154 further out of the recess 150 of the piston rod 144. The inner tie rod housing 154 can include a raised portion 196 adjacent the external threads 156. The raised portion 196 has a larger diameter than the external threads 156 and can limit or prevent the inner tie rod housing 154 from moving further into the recess 150 of the piston rod 144 beyond a preselected distance or depth.

A tie rod 160 can connect between the steering cylinder 142 and the steering knuckle 130. The length of the tie rod 160 can be adjustable. The tie rod 160 can include an inner tie rod 162 and an outer tie rod 164. The inner tie rod 162 can include a first end 166 positioned at least partially in the inner tie rod housing 154. The first end 166 of the inner tie rod 162 can have a curved or spherical shape. The interior surface 158 of the inner tie rod housing 154 can have a curved or spherical shape surrounding at least a portion of the first end 166 of the tie rod 160. The interior surface 158 of the inner tie rod housing 154 can have a complementary shape with the first end 166 of the inner tie rod 162. The interior surface 158 of the inner tie rod housing 154 and the first end 166 of the inner tie rod 162 can form a ball and socket joint. The inner tie rod housing 154 retains the first end 166 of the inner tie rod 162 in the recess 150 of the piston rod 144.

A retention apparatus or retainer 170 can be positioned at least partially in the recess 150 of the piston rod 144. The retainer 170 can be positioned adjacent to the inner tie rod housing 154. The retainer 170 can be in contact with the inner tie rod housing 154. The retainer 170 can have a larger diameter than the inner tie rod housing 154. The retainer 170 includes an axially extending portion or wall portion 174. The retainer 170 can have a clearance fit, a transition fit, or an interference fit between an outer surface of the wall portion 174 and the inner wall 148 of the interior space or recess 150 of the piston rod 144. The inner wall 148 can include a step 190 having a larger diameter for the retainer 170.

The retainer 170 can include a protrusion 172 extending outwardly from an outer surface of the wall portion 174 of the retainer 170. The protrusion 172 can resist, inhibit, or prevent rotation of the retainer 170 when the retainer 170 is inserted or installed in the piston rod 144. The protrusion 172 can create a clearance fit, a transition fit, or an interference fit between the protrusion 172 and the inner wall 148 of the interior space or recess 150 of the piston rod 144. The protrusion 172 can have a curved or arcuate shape extending from the outer surface of the wall portion 174. Alternatively, or additionally, the inner wall 148 of the piston rod 144 can include an indentation 152, which corresponds to and receives the protrusion 172. The protrusion 172 can create a clearance fit, a transition fit, or an interference fit between the protrusion 172 and the indentation 152.

The retainer 170 can include a rim, collar, or flange portion 176 extending inwardly in the radial direction. The flange portion 176 can include one or more openings or slots 178. The flange portion 176 can include two, three, four, or more openings or slots 178. The retainer 170 can include an inner channel or groove 182 on an inner surface of the wall portion 174. The inner groove 182 can receive a protective cover or guard. The retainer 170 can include an outer channel or groove 184 on the outer surface of the wall portion 174. The outer groove 184 can receive a seal, for example an O-ring.

One or more fasteners 192 can releasably attach the retainer 170 to the inner tie rod housing 154. The one or more fasteners 192 can extend through one of the slots 178 and fasten into the inner tie rod housing 154, which can include one or more threaded apertures 194 for receiving the one or more fasteners 192. The one or more fasteners 192 can be positioned around the circumference of the retainer, extend through corresponding slots 178, and thread into corresponding threaded apertures 194 in the inner tie rod housing 154.

When the retainer 170 is inserted or installed in the piston rod 144 and fastened or otherwise connected to the inner tie rod housing 154, the retainer 170 resists, inhibits, or prevents rotation of the inner tie rod housing 154. This maintains the position of the inner tie rod housing 154 and the first end 166 of the inner tie rod 162 relative to the piston rod 144. The connection of the retainer 170 to the inner tie rod housing 154 assists with holding the position of the retainer 170 relative to the piston rod 144.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A steering assembly, comprising:
   a piston rod including internal threads positioned on an inner wall of a recess;
   an inner tie rod housing including external threads engaging with the internal threads, the inner tie rod housing adjustably connected to the piston rod;

a tie rod including an inner tie rod having an end positioned at least partially in the inner tie rod housing;

a retainer including a wall portion and a flange portion, the retainer positioned at least partially in the recess, the retainer including a protrusion extending from an outer surface of the wall portion and contacting the inner wall of the recess, which resists rotation of the retainer; and one or more fasteners releasably attaching the retainer to the inner tie rod housing.

2. The steering assembly of claim 1, wherein the retainer resists rotation of the inner tie rod housing.

3. The steering assembly of claim 1, wherein the retainer is positioned adjacent to the inner tie rod housing.

4. The steering assembly of claim 1, wherein the inner wall of the recess includes an indentation corresponding to the protrusion of the retainer.

5. The steering assembly of claim 1, wherein the retainer has a larger diameter than the inner tie rod housing and the inner wall of the recess includes a step having a larger diameter for the retainer.

6. The steering assembly of claim 1, wherein the flange portion includes one or more slots which the one or more fasteners pass through and thread into one or more apertures in the inner tie rod housing.

7. The steering assembly of claim 1, wherein the retainer includes an inner groove in an inner surface of the wall portion.

8. The steering assembly of claim 1, wherein the retainer includes an outer groove in the outer surface for receiving a seal.

9. The steering assembly of claim 1, wherein the inner tie rod housing retains the end of the inner tie rod within the recess of the piston rod.

10. The steering assembly of claim 1, wherein the one or more fasteners are positioned around a circumference of the retainer.

11. A work vehicle including a steering assembly, comprising:

a piston rod including internal threads positioned on an inner wall of a recess;

an inner tie rod housing including external threads engaging with the internal threads, the inner tie rod housing adjustably connected to the piston rod;

a tie rod including an inner tie rod having an end positioned at least partially in the inner tie rod housing;

a retainer including a wall portion and a flange portion, the retainer positioned at least partially in the recess, the retainer including a protrusion extending from an outer surface of the wall portion and contacting the inner wall of the recess, which resists rotation of the retainer; and one or more fasteners releasably attaching the retainer to the inner tie rod housing.

12. The work vehicle of claim 11, wherein the retainer resists rotation of the inner tie rod housing.

13. The work vehicle of claim 11, wherein the retainer is positioned adjacent to the inner tie rod housing.

14. The work vehicle of claim 11, wherein the inner wall of the recess includes an indentation corresponding to the protrusion of the retainer.

15. The work vehicle of claim 11, wherein the retainer has a larger diameter than the inner tie rod housing and the inner wall of the recess includes a step having a larger diameter for the retainer.

16. The work vehicle of claim 11, wherein the flange portion includes one or more slots which the one or more fasteners pass through and thread into one or more apertures in the inner tie rod housing.

17. The work vehicle of claim 11, wherein the retainer includes an inner groove in an inner surface of the wall portion.

18. The work vehicle of claim 11, wherein the retainer includes an outer groove in the outer surface for receiving a seal.

19. The work vehicle of claim 11, wherein the inner tie rod housing retains the end of the inner tie rod within the recess of the piston rod.

20. The work vehicle of claim 11, wherein the one or more fasteners are positioned around a circumference of the retainer.

\* \* \* \* \*